(12) United States Patent
Sprehe et al.

(10) Patent No.: US 8,993,747 B2
(45) Date of Patent: Mar. 31, 2015

(54) PROCESS FOR IMPROVED PRODUCTION OF ALKALI CELLULOSE AND CELLULOSE DERIVATIVES

(75) Inventors: Matthias Sprehe, Walsrode (DE); Bettina Hoelzer, Walsrode (DE)

(73) Assignee: Dow Global Technologies LLC, Midland, MI (US)

( * ) Notice: Subject to any disclaimer, the term of this patent is extended or adjusted under 35 U.S.C. 154(b) by 852 days.

(21) Appl. No.: 13/144,948

(22) PCT Filed: Jan. 8, 2010

(86) PCT No.: PCT/US2010/020430
§ 371 (c)(1),
(2), (4) Date: Oct. 25, 2011

(87) PCT Pub. No.: WO2010/101667
PCT Pub. Date: Sep. 10, 2010

(65) Prior Publication Data
US 2012/0041187 A1  Feb. 16, 2012

Related U.S. Application Data

(60) Provisional application No. 61/157,685, filed on Mar. 5, 2009.

(51) Int. Cl.
| | |
|---|---|
| C08B 1/08 | (2006.01) |
| C08B 1/10 | (2006.01) |
| C08B 17/06 | (2006.01) |
| B01F 3/08 | (2006.01) |
| B01F 7/04 | (2006.01) |
| B01F 7/24 | (2006.01) |
| B01F 7/30 | (2006.01) |
| B01F 13/10 | (2006.01) |
| C08B 11/193 | (2006.01) |

(52) U.S. Cl.
CPC ............... C08B 1/10 (2013.01); B01F 3/0853 (2013.01); B01F 3/088 (2013.01); B01F 7/04 (2013.01); B01F 7/248 (2013.01); B01F 7/302 (2013.01); B01F 13/1027 (2013.01); B01F 13/105 (2013.01); C08B 11/193 (2013.01)
USPC .................. 536/56; 536/70; 536/76; 536/77; 536/84; 536/85

(58) Field of Classification Search
CPC .............. C08B 1/08; C08B 1/10; C08B 17/06
USPC ................................ 536/56, 70, 76, 77, 84, 85
See application file for complete search history.

(56) References Cited

U.S. PATENT DOCUMENTS

| | | |
|---|---|---|
| 1,870,980 A | 8/1932 | Altwegg |
| 2,392,269 A | 1/1946 | Schmitz, Jr. |
| 2,452,542 A | 11/1948 | Bradshaw et al. |
| 2,592,112 A | 4/1952 | Bradshaw et al. |
| 3,388,082 A | 6/1968 | Rodgers, Jr. et al. |
| 3,839,319 A | 10/1974 | Greminger, Jr. et al. |
| 4,260,739 A | 4/1981 | Geyer, Jr. et al. |
| 4,310,663 A | 1/1982 | Hilbig et al. |
| 4,363,784 A | 12/1982 | Hilbig et al. |
| 4,456,751 A | 6/1984 | Messelt et al. |
| 4,460,766 A | 7/1984 | Felcht et al. |
| 4,477,657 A | 10/1984 | Strange et al. |
| 4,845,206 A | 7/1989 | Thomson et al. |
| 7,361,753 B2 | 4/2008 | Hammes et al. |
| 2002/0099203 A1 | 7/2002 | Kobayashi |
| 2005/0240016 A1 | 10/2005 | Schlesiger et al. |
| 2006/0287518 A1 | 12/2006 | Narita et al. |
| 2007/0144692 A1 | 6/2007 | Narita et al. |
| 2007/0149773 A1 | 6/2007 | Narita et al. |

FOREIGN PATENT DOCUMENTS

| | | |
|---|---|---|
| EP | 035 633 A2 | 9/1981 |
| JP | 2001-302701 | 10/2001 |

OTHER PUBLICATIONS

G. Bartelmus, et al., "Analysis of Cellulose Ether Groups", Z. Anal. Chem., vol. 286, (1977) 161-190.

*Primary Examiner* — Patrick Lewis
*Assistant Examiner* — Everett White

(57) ABSTRACT

The present invention relates to a process for the production of alkali cellulose for the production of alkali cellulose and, optionally, cellulose ethers from cellulose in the presence of alkali and, if applicable, with alkylating and/or hydroxyalkylating agent(s) comprising the reaction of a cellulose with an alkali metal hydroxide, wherein the alkali metal hydroxide is mixed with cellulose in a mixing apparatus, the mixing apparatus (1) having an upper region (20, 102*a*, 202*a*) with a first cross-section and a lower region (21, 102*b*, 202*b*) with a second cross-section, the second cross-section being the same as or smaller than the first cross-section and comprising at least one non-horizontally oriented mixing device (23, 27, 121, 221, 224).

15 Claims, 3 Drawing Sheets

PROCESS FOR IMPROVED PRODUCTION OF ALKALI CELLULOSE AND CELLULOSE DERIVATIVES

CROSS REFERENCE TO RELATED APPLICATIONS

This application is a 35 USC §371 national phase filing of PCT/US2010/020430, filed Jan. 8, 2010, which claims the benefit of U.S. Application No. 61/157,685, filed Mar. 5, 2009.

FIELD OF THE INVENTION

This invention relates to a process for the production of alkali cellulose and, optionally, cellulose derivatives.

BACKGROUND OF THE INVENTION

Cellulose derivatives, such as cellulose ethers are conventionally prepared in two stages, i.e. (1) an alkalization stage wherein an alkali metal hydroxide is reacted with cellulose to prepare an alkali cellulose, and (2) a derivatization stage, preferably an etherification stage, wherein a derivatizing agent, such as an etherifying agent is reacted with the alkali cellulose to form the cellulose derivative. Dispersing agents or solvents are sometimes added to one or both stages to obtain better mixing. Typically cellulose in finely divided state is reacted in a first stage with an alkaline solution, e.g. an alkali metal hydroxide, the alkaline solution generally being sprayed upon the cellulose fiber and reacted therewith in an alkalization reaction to form the alkali cellulose. Preferably the alkali cellulose is reacted in a second stage with an etherifying agent in an etherification reaction to form the cellulose ether.

In the alkalization reaction the reactor is vigorously stirred, e.g. in a heterogeneous reaction medium, to mix the alkali metal hydroxide and cellulose as uniformly as possible, and generally the reaction is carried out at low, often ambient, temperature.

Cellulose reactions take place under heterogeneous conditions. The accessibility of the anhydroglucose units (AGU's) therefore influences the reactivity of the cellulose in the various reactions to a large degree. It has been known for a long time that the reactivity of the cellulose is substantially improved or even made possible by an activation process with a sodium hydroxide solution. Here, the aim of the activation is to increase the reaction rate or the maximum achievable degree of substitution in the subsequent reaction of the cellulose and to achieve a more uniform substituent distribution and complete accessibility of the anhydroglucose units.

As mentioned, the most frequently used activating agent is a sodium hydroxide solution which, being an intrafibrillar swelling agent, causes structural change of the fibrillar units of the cellulose. In addition, apart from the structural loosening of the cellulose, the presence of hydroxyl ions is required in numerous cellulose reactions, such as, for example, the formation of carboxymethylcelluloses, methylcelluloses, hydroxyalkylcelluloses, hydroxyalkylmethylcelluloses or cellulose xanthogenates. Uniform alkalization is highly desired for the product quality strived for.

Methylcellulose and its mixed ethers comprising methoxyl groups are typically prepared in a multistage process. In the first stage, the cellulose used is ground to a desired particle size spectrum. In the second stage, the ground cellulose is intimately mixed with an aqueous solution, preferably a concentrated aqueous solution, of an alkali metal hydroxide, in particular sodium hydroxide, in a mixer and activated to produce alkali metal cellulose. The known processes are spray alkalization in a suitable mixing unit in which the ground cellulose is sprayed with an alkali metal hydroxide solution. In a slurry process, the ground cellulose is suspended in a suspension medium and the alkali metal hydroxide is then added. In a slurry alkalization process, the cellulose is suspended in a sodium hydroxide solution and then passed through screw presses or sieve drum presses to remove excessive caustic soda. In the third stage, a heterogeneous reaction is effected with an alkyl halide to be added, such as, for example, methyl chloride or ethyl chloride, and with a hydroxyalkylating agent, such as ethylene oxide and/or propylene oxide and/or butylene oxide. Further process stages may comprise the purification of the cellulose ether, grinding and/or drying.

In the industrial production of MC (methyl cellulose) and MHAC (methyl hydroxyalkyl cellulose) the alkalization, and in particular the etherification with etherifying agents, such as, for example, methyl chloride, ethyl chloride, ethylene oxide, propylene oxide and/or butylene oxide, comprises exothermic reaction stages with considerable generation of heat. Since suspension media, such as, for example, dimethyl ether and/or methyl chloride are usually used in a slurry process, the increase in temperature is associated with a simultaneous pressure increase. Because the alkalization usually takes place at atmospheric pressure or slightly superatmospheric pressure, the reaction can therefore be divided into a low pressure (alkalization) and high pressure (etherification) process sequence.

For a very wide range of fields of use, cellulose ethers having different degrees of substitution are prepared. The alkyl substitution is generally described by the DS in cellulose ether chemistry. The DS is the average number of substituted OH groups per anhydroglucose unit. The methyl substitution is stated, for example, as DS (M). Usually, the hydroxyalkyl substitution is described by the MS. The MS is the average number of moles of the etherifying reagent which form ether-like bonds per mole of anhydroglucose unit. The etherification with the etherifying reagent ethylene oxide is stated, for example, as MS (HE), and the etherification with the etherifying reagent propylene oxide is stated as MS (HP). The determination of the side groups is effected by the Zeisel method (literature: G. Bartelmus and R. Ketterer, Z. Anal. Chem. 286 (1977) 161-190).

Various properties of the products are established via the degree of etherification and the type of substituents, such as, for example, the thermal flocculation point, the solubility, the viscosity, the film formation capacity, the water retention capacity and the adhesive strength. MC and MHAC are used in different fields of use, for example as consistency regulators and processing aids in mineral and dispersion-based construction material systems or in the production of cosmetic and pharmaceutical compositions. Cellulose ethers having high degrees of substitution are also suitable as thickeners for organic solvents.

An overview of the chemical fundamentals and principles of production (production processes and process steps) and a list of substances and description of the properties and potential uses of the various derivatives is disclosed, for example, in Houben-Weyl, Methoden der Organischen Chemie, Makromolekulare Stoffe [Methods of Organic Chemistry, Macromolecular Substances], 4th edition, volume E 20, page 2042 (1987).

Although cellulose ethers as an end product with an appropriate degree of substitution are usually soluble in water at a temperature below the dissolution temperature, a small insoluble fraction is usually retained, which causes turbidity of the solution. This turbidity is primarily caused by insoluble cellulose fibres which were not sufficiently activated by the alkali metal hydroxide and have acquired a lower degree of substitution. The magnitude of the turbidity and of the proportion of undissolved fibres has an adverse effect on the usability of the cellulose ethers for certain fields of use. For example, the use of cellulose ethers for the production of transparent hard capsules in the pharmaceutical sector may be mentioned here. A low fibre content is also required for the use of cellulose ethers in ceramic extrusion for automotive catalytic converters, in order to avoid possible material defects. Very efficient and uniform alkalization is highly desirable for the production of a homogeneously substituted cellulose ether having a small insoluble fibre fraction.

In addition, the coupling of low pressure and high pressure process steps results in increased equipment requirements. Usually, pressure-resistant horizontal, cylindrical drums equipped with a horizontal central shaft with specific mixing elements, such as ploughshares, Becker blades, T-blades, paddles, mixing spirals or mixing ribbons, are used in the production of cellulose ethers for the alkalization and/or the heterogeneous etherification. Examples for such mixing reactors which follow the principle of throw or intensive mixers (rotor speeds are above the critical speed which means that particles are hurled out of the material bed) are DRUVATHERM® Reaktor DVT or All In One Reactor® TR from Gebr. Lödige Maschinenbau GmbH, Germany. In addition, some of the reaction mixers are equipped with shredders, commonly designated as choppers or cutting rotors in order to achieve an additional mixing effect or a good distribution of an additive. For effective cooling or heating, these mixers are typically provided with a double jacket or cooling/heating coils. Embodiments having attached condensers and external condensers are also known.

Regarding the optimization of alkalization, various approaches were adopted in the past. In this context, an improved distribution of the sodium hydroxide solution by premixing with an etherifying agent in a nozzle prior to mixing with the cellulose is reported (U.S. Pat. No. 4,845,206 A). Furthermore, improved alkalization upon addition of surface-active substances is described (U.S. Pat. No. 7,361,753). Low pressure spray alkalization takes place in these processes in pressure resistant reaction vessels. The use of an expensive and complex pressure resistant reactor for low pressure alkalization is undesirable when optimum use of apparatus and plant utilization is desired.

A number of patent applications have been published which are concerned with the subject of optimized alkalization for reducing the undissolved fibre content. Separate alkalization steps in suitable apparatuses are described. Described are the implementation of a slurry process for alkalization with downstream removal of alkali and the implementation of an upstream continuous spray alkalization in a very wide range of units. For example, bucket chain conveyors (US 2007/0149773 A1), kneaders (US 2002/0099203 A1), rotary pressure filters (US 2007/0144692 A1), high-intensity mixers (US 2006/0287518 A1) or screw conveyors (US 2007/0149773 A1) are used here. The uniform feed of sodium hydroxide solution to a constant and continuous flow of cellulose mass while ensuring thorough mixing is the aim of the continuous alkalization disclosed in these publications. The advantage of the decoupling of low pressure and high pressure process steps is not disclosed in these publications. In addition, the critical restrictions of continuously metering and ensuring a constant cellulose mass flow to achieve a constant and uniform concentration of sodium hydroxide in all parts of the cellulose are emphasized.

Other processes for the production of methyl hydroxyalkyl celluloses are described, inter alia, in US 2005/0240016 A1 and in U.S. Pat. No. 3,388,082 A, U.S. Pat. No. 4,456,751 A, U.S. Pat. No. 4,477,657 A, and U.S. Pat. No. 3,839,319 A.

Therefore, it is an object of the present invention to provide a process which optimizes the production of alkali cellulose. It is a preferred object of the present invention to provide a process ensuring homogeneous and/or uniform alkalization of the cellulose in order to obtain in the following derivatization process homogeneously substituted cellulose derivatives. Preferred derivatization processes are alkylating and/or hydroxyalkylating step(s) to produce homogeneously and/or uniformly substituted cellulose ethers.

SUMMARY OF THE INVENTION

The technical object is solved by a process for the production of alkali cellulose comprising the reaction of a cellulose with an alkali metal hydroxide according to claim 1 wherein the alkali metal hydroxide is mixed with cellulose in a mixing apparatus, the mixing apparatus having an upper region with a first cross-section and a lower region with a second cross-section, the second cross-section being the same as or smaller than the first cross-section and comprising at least one non-horizontally oriented mixing member.

The technical object is also solved by use of a mixing apparatus for the production of alkali cellulose and/or for the production of cellulose derivatives, wherein the mixing apparatus has an upper region with a first cross-section and a lower region with a second cross-section, the second cross-section being the same as or smaller than the first cross-section and comprising at least one mixing device movable by and/or around a non-horizontally oriented rotation axis, preferably a centrally and non-horizontally oriented continuous or divided single-shaft mixing device.

DETAILED DESCRIPTION OF THE INVENTION

Figure 1:
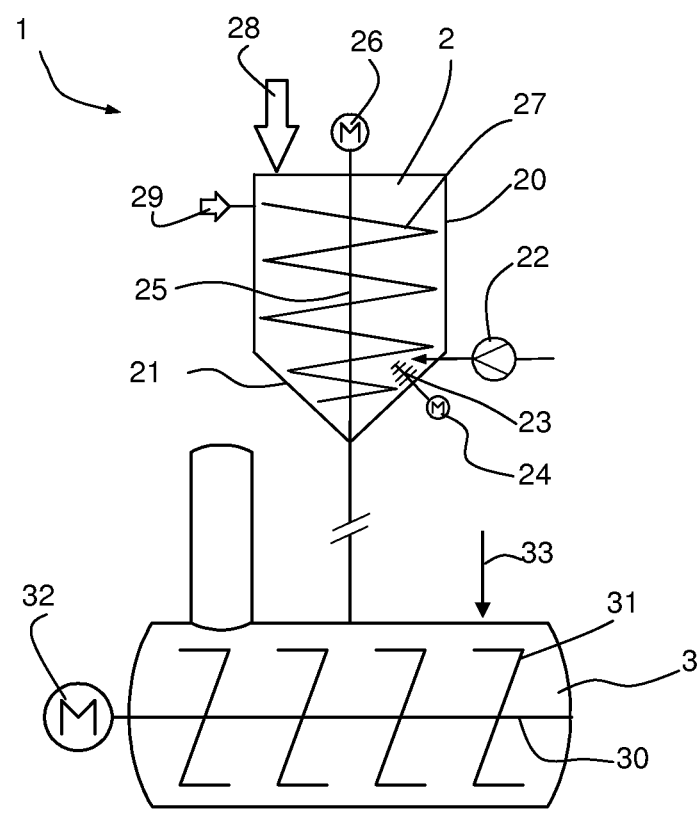
FIG. 1 illustrates a first embodiment of a mixing apparatus according to the present invention comprising a vertical mixer with a cylindrical upper part and a tapering lower part.

The invention relates to a process for the production of alkali cellulose comprising the reaction of a cellulose with an alkali metal hydroxide, wherein preferably an aqueous solution of the alkali metal hydroxide in an amount sufficient for partial or entire alkalization of the cellulose is added at a feed point to the cellulose in a preferably vertical mixing apparatus and is thoroughly mixed with the cellulose, preferably by means of a loop flow. Vertical in the sense of the present invention means essentially in the direction of the longitudinal axis or extension, respectively, of the mixing apparatus. Loop flow provides a convective mixing where the rotor speeds are low and the movement of the particles by the mixing elements is achieved by shift. The mixing principle is called "convective mixing". This convective mixing principle differs from a standard horizontal ploughshare mixer also called a "throw mixer" or "intensive mixer" in that rotor speeds in these standard horizontal mixers are above the critical speed, which means that particles are hurled out of the material bed.

The mixing apparatus has an upper region with a first cross-section and a lower region with a second cross-section; the second cross-section in the lower region is preferably smaller than the cross-section in the upper region. The mixing apparatus may comprise a vertically oriented conically shaped section; the vertically oriented conically shaped section preferably being provided in the lower part of the mixing apparatus. So, the mixing apparatus preferably comprises a vertically arranged conical part. The mixing apparatus (1) preferably comprises a mixing device rotatable by an essentially centrally and vertically oriented axis. More preferably, the mixing apparatus comprises a vertical convective mixer, also called "vertical mixer", which is characterized in that a three-dimensional mixing of the mixer content is preferably effected by a mixing device via a continuous or divided single-shaft or double-shaft centrally and vertically arranged or planetarily fixed by an orbital arm. The mixing apparatus with respect to its longitudinal extension may also comprise a diagonally oriented mixing device being capable of rotating around a vertical axis. The single-shaft mixing device is preferably in the form of a screw or single or double helix or is equipped with mixing blades or mixing paddles.

More preferably, essentially the total mixer content undergoes continuous thorough mixing, preferably convective mixing, such as loop mixing in the same direction. The characteristic loop flow preferably passes through a narrowing cross section, such as, for example, one or two conical regions. The alkali metal hydroxide is preferably added to the cellulose at a feed point in a region of the mixing apparatus having a tapering cross section, preferably an conically tapering cross section. The addition of the alkali metal hydroxide is especially effected via a nozzle or lance. The alkali metal hydroxide is preferably added to the mixing device as an aqueous solution. Alternatively, alkali metal hydroxide can be added in solid form, such as pellets, to an aqueous cellulose composition. The nozzle or lance is preferably a smooth-jet nozzle, conical nozzle, fan nozzle, hollow-cone nozzle, solid-cone nozzle, binary nozzle or flat-jet nozzle. Preferred alkali celluloses are potassium cellulose or, more preferably, sodium cellulose.

The alkali metal hydroxide is preferably added to the cellulose at a feed point in the lower region of the mixing apparatus. The feed point of the alkali metal hydroxide is preferably located in the region of the narrowing cross section such that the mixing of the alkali metal hydroxide with the other mixing components is more effective. The distribution of the alkali metal hydroxide, preferably the sodium hydroxide solution, is preferably promoted by a mixing or cutting rotor located in the vicinity of the feed point of the alkali metal hydroxide. Furthermore, the mixing apparatus is optionally coolable by a cooling jacket or cooling coils to be able to cool the content of the mixing apparatus during mixing, and/or the mixing apparatus can be operated under an inert atmosphere (e.g. vacuum-tight), and/or the mixing apparatus is designed to be resistant to pressure surges for downstream pressure reactions such that any pressure surges will not destroy the mixing apparatus or disturb the mixing process.

For example, a typical vertical mixer chosen consists of a cylindrical part and a part tapering conically towards the bottom or lower outlet. The main stirring member consists of a helical mixing unit having a centrally arranged stirrer axle supported at the top. With the aid of the screw conveying, the material is conveyed in a loop flow on the container wall in an upward direction and back downwards in the vicinity of the stirrer axis. In addition, the vertical mixer is equipped with feed nozzles at the container top and in the cone region. In the cone region, there is also an additional mixing by the operation of a mixing or cutter rotor.

Examples for vertical mixing apparatus following the principle of convective mixing, preferably with a loop flow are the conical single-shaft mixer type AM available from Amixon GmbH, the Vrieco-Nauta types CT dryer and LFC/MFC or truncated cone mixer available from Hosokawa Micron Ltd., the vertical bulk material mixer type VSM and VGM available from Ekato Systems GmbH or the conical mixer type HVW available from AVA-Huep GmbH & Co. KG.

Contrary to the prevailing opinion according to which an efficient distribution of the alkali metal hydroxide solution is achievable by spraying onto the circulated surface of the ground cellulose at the top of the reactor, the invention has adopted the approach of metering the alkali metal hydroxide solution into the bulk material, preferably in the cone region of the mixer.

Advantages of the alkalization by means of a directed loop flow are intensive, rapid and uniform distribution of the alkali metal hydroxide solution. The internal loop simplifies uniform distribution of the alkali metal hydroxide solution by adding continuously the alkali metal hydroxide to the permanently revolved batch (loop flow) of ground cellulose. Advantages of the alkalization in the vertical mixer are substantially complete and rapid material discharge with a minimum amount of residuals and a minimum of dead spaces during mixing. Moreover, the space between wall and mixing tools can be minimized. This is in contrast to elongated horizontally oriented mixers which exhibit sagging of the horizontal axle and need a larger space between wall and mixing tools.

The alkalization of cellulose is preferably effected with an alkali metal hydroxide in aqueous solution, such as sodium hydroxide or potassium hydroxide, preferably with a 35 to 60 wt.-% sodium hydroxide solution, particularly preferably with a 48 to 52 wt.-% sodium hydroxide solution.

Before, during or after the alkalization, a suspension medium, for example a mixture of dimethyl ether and methyl chloride, is optionally added to the mixture. A suspension medium contributes to improved mixing and acts as a mixing aid. Further, a suspension medium may be used as a heat transfer media for faster cooling and heating. Furthermore, the addition of the suspension medium at this stage may be conducted to prevent a separated loading step such that the combination of steps may save time.

The alkalization of the cellulose used is preferably effected with 0.8 to 7.0 eq of alkali metal hydroxide per AGU (anhydroglucose units), more preferably with 1.1 to 6.5 eq of alkali metal hydroxide per AGU, particularly preferably with 1.4 to 6.0 eq of alkali metal hydroxide per AGU. NaOH is the preferred alkali metal hydroxide. Generally the alkalization is carried out at temperatures of 15 to 50° C., preferably about between 25 and 45° C., and for 5 to 80 minutes, preferably from 10 to 60 minutes.

Furthermore, the invention relates to a process for the production of cellulose derivatives, preferably cellulose ethers, more preferably at production scale, from alkali cellulose which is obtained according to the above described process and further comprising a reaction of the alkali cellulose with one or more derivatizing agents for the production of cellulose derivatives. The derivatizing agent preferably is an alkylating and/or hydroxyalkylating agent.

In a preferred embodiment of the invention a spray alkalization is carried out in a separate vertical mixer as described above, preferably having a central stirring device, before the derivatization, such as alkylation and/or alkoxylation takes place in a separate pressure-resistant reaction vessel. More preferably, the reaction vessel utilized for alkylation and/or alkoxylation is pressure and vacuum resistant. It has surprisingly been found that cellulose derivatives having an even further reduced turbidity and further reduced insoluble fibre content can be obtained if the spray alkalization is carried out in a separate vertical mixer as described above and the derivatization subsequently takes place in a separate pressure-resistant reactor. Moreover, this process permits a reduced batch cycle time for the pressure-resistant reaction vessel and hence improved utilization of the apparatus. Furthermore, there are reduced capital costs due to separation of low-pressure and high-pressure processes. Finally, due to the external alkalization the reactor occupancy time can be reduced resulting in the possibility of boosting existing plants.

The alkylating and/or hydroxyalkylating reactions are exothermic and preferably take place at an elevated pressure up to 15 to 30 bar. In a suspension with lower solid content lower pressures can be achieved. The alkalization is exothermic and can be operated at vacuum, ambient pressure and in the presence of a low boiling component (e.g. dimethyl ether and/or methyl chloride) also at higher pressures. Therefore, in the above process for the production of cellulose ethers, the vertical mixing apparatus can be either pressure-resistant or not pressure-resistant depending on the intended manufacturing procedure of the multi-step production of the cellulose ethers. In case that the mixing apparatus is pressure resistant, the alkali cellulose can be reacted with the alkylating and/or hydroxyalkylating agent(s) in the mixing apparatus or can be transferred to another pressure resistant reaction vessel, and reacted there with the alkylating and/or hydroxyalkylating agent(s). Alternatively, if the mixing apparatus is not pressure resistant, the alkali cellulose is preferably transferred to a pressure resistant reaction vessel, and reacted there with the alkylating and/or hydroxyalkylating agent(s).

In the process for the production of cellulose ethers according to the present invention the alkylating agent is preferably an alkyl halide, such as methyl chloride or ethyl chloride, and/or the hydroxyalkylating agent is preferably an alkylene oxide, such as ethylene oxide, propylene oxide or butylene oxide, or combinations thereof. With "combinations thereof" is meant that cellulose ethers having one or more different alkyl groups and/or one or more different hydroxyalkyl groups can be produced. Examples of cellulose ethers available by the process of the present invention are alkylcelluloses, hydroxyalkylalkylcelluloses or hydroxyalkylcelluloses, in particular methylcellulose, methyl hydroxyethylcellulose, methylhydroxypropylcellulose, hydroxyethylcellulose, ethylhydroxyethylcellulose, methylethylhydroxyethylcellulose, methylhydroxyethylhydroxypropylcellulose, methylhydroxyethylhydroxybutylcellulose or cellulose ethers which at the same time comprise methyl groups and longer-chain hydrophobic side chains.

In order to control the type and the degree of the substitution(s) at the cellulose, the reaction steps in the process of the invention can be repeated and independently adapted to the desired type and degree of substitution. For example, the process can be carried out in such a way that partial alkalization is effected, followed by partial etherification, followed by a further partial alkalization and another etherification.

In the following embodiments of the invention will be further described by reference to the drawings, wherein:

FIG. 1 shows a first embodiment of a mixing apparatus 1 comprising a vertical mixer 2. The vertical mixer 2 has an upper cylindrical part 20 and a lower tapering part 21. At the border region between these both parts 20, 21 in the lower tapering part 21 an inlet valve 22 is provided for inserting alkali metal hydroxide and further components or reactants into the vertical mixer 2. A mixing device 23 with a motor 24 is also provided in this lower region of the vertical mixer 2 near the inlet valve 22 to distribute the materials inserted via the inlet valve 22.

The vertical mixer 2 further comprises a vertical rotational axis 25 connected to a motor 26 and having a mixing device 27 movable by rotating the axis 25. The vertical axis 25 extends centrally through the whole vertical mixer 2.

The vertical mixer 2 also comprises an inlet opening 28 for inserting a ground cellulose batch and an inlet opening 29 for inserting inert media, e.g. $N_2$. These both inlet openings 28 and 29 are provided at the upper end of the cylindrical part 20.

The mixing apparatus 1 further comprises a mixing reactor 3 connected to the lower end of the vertical mixer 2. The mixing reactor is a cylindrical pressure resistant horizontal mixing reactor and comprises a rotational axis 30 extending through the whole mixing reactor and comprising some mixing means 31 connected to the axis 30 and a motor 32 for rotating the horizontally extending axis 30. The mixing reactor 3 further comprises an inlet opening 33 for inserting hydroxyalkylating agent and/or alkylating agent and/or suspension medium and further components or reactants.

Figure 2:
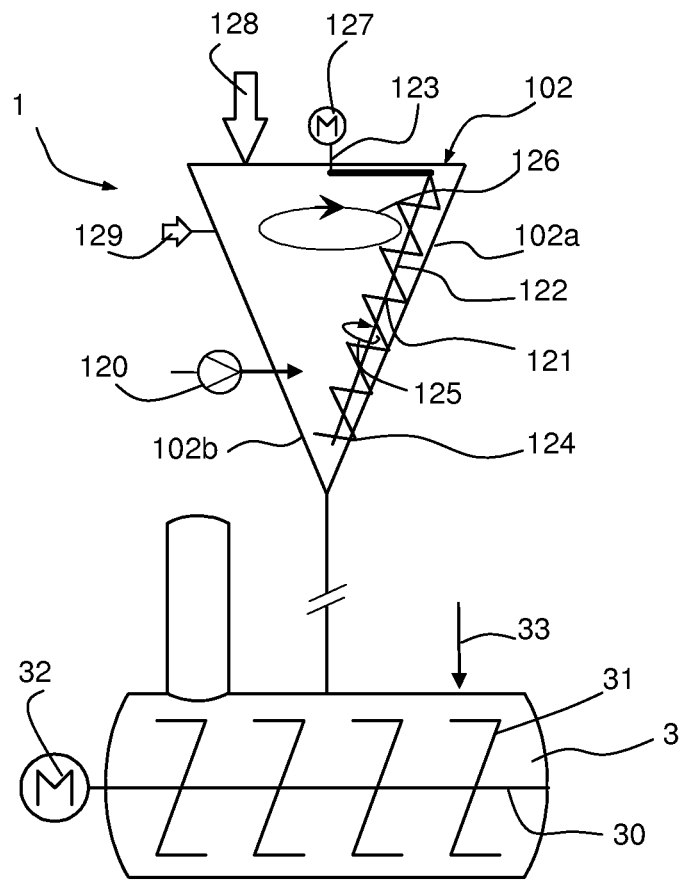
FIG. 2 illustrates a second embodiment of a mixing apparatus according to the present invention comprising a conically shaped vertical mixer.

According to FIG. 2 the mixing apparatus 1 comprises a conically shaped vertical mixer 102. The cross section of the upper section 102a is, thus, wider than the cross section of the lower section 102b of the vertical mixer 102. The vertical mixer 102 comprises an inlet valve 120 in its lower region for inserting alkali metal hydroxide and further components or reactants. It further comprises a special kind of mixing device 121 being rotated around two axis 122, 123. The axis 122 extends essentially parallel to the conically shaped housing 124 of the vertical mixer whereas the second axis 123 is in principal a central axis of the vertical mixer. This axis 123, however, does not extend through the whole housing of the vertical mixer but only extends through a very small part of it and is bent horizontally then to be connected to the other axis 122. There may also be provided a horizontally extending connecting means to connect the short axis 123 and the longer axis 122. Arrows 125, 126 show both rotations of the axes 122, 123. Axis 123 is connected to a motor 127 to move this axis. This motor or an additional motor may also rotate the other axis 122 or axis 122 may be rotated automatically when rotating axis 123.

The vertical mixer 102 also comprises an inlet opening 128 for inserting ground cellulose batch and an inlet opening 129 for inserting an inert medium, e.g. $N_2$.

The mixing reactor is the same as the one described above with regard to FIG. 1.

Figure 3:
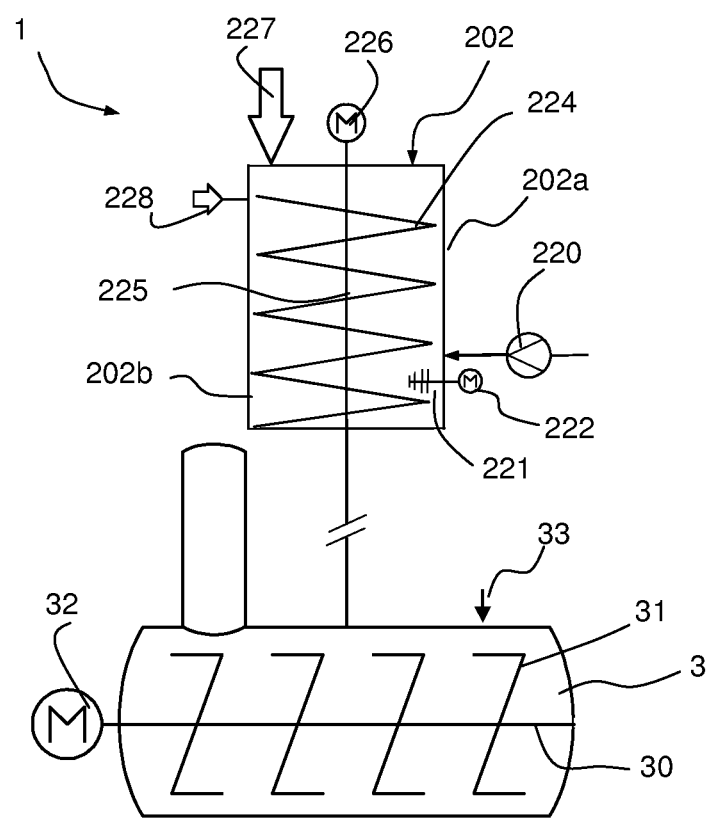
FIG. 3 illustrates a third embodiment of a mixing apparatus according to the present invention comprising a cylindrically shaped vertical mixer.

According to FIG. 3 the mixing apparatus 1 comprises a cylindrically shaped vertical mixer 202. The cross section of the upper section 202a of the vertical mixer 202 is, thus, essentially the same as the cross section of the lower section 202b of the vertical mixer 202. The vertical mixer 202 comprises an inlet valve or opening 220 in the lower region of the mixer to supply alkali metal hydroxide and further components or reactants. Near the inlet opening or valve 220a mixing device 221 comprising a motor 222 for rotating the mixing device is provided. According to the embodiment in FIG. 3 the mixing device 221 is provided below the opening or valve 220. This mixing device 221 is provided for pre-distributing the inserted material. For the mixing of the materials in the vertical mixer 202a further mixing device 224 is provided surrounding a vertical axis 225. The vertical rotational axis 225 is connected to a motor 226 for rotating the axis.

The vertical mixer 202 further comprises an inlet opening 227 for inserting ground cellulose batch and an inlet opening 228 for inserting an inert medium, e.g. $N_2$. Both inlet openings 227, 228 are provided in the upper part of the vertical mixer 202.

According to the embodiments shown in FIGS. 1 and 2 the embodiment of a mixing apparatus according to FIG. 3 also comprises the mixing reactor 3.

The following examples further illustrate the process for producing alkali cellulose according to the present invention by use of a respective mixing apparatus like the ones described above. The examples are not to be construed to limit the scope of the present invention.

EXAMPLES

After initial mixing experiments for establishing the optimum operating parameters like stirrer speed, duration of mixing, nozzle position and geometry, production of different cellulose ethers were carried out with the aid of the vertical mixer for external alkalization. In particular, the alkalization parameters and the cellulose raw material types used were varied. For comparison of the results, the cellulose ethers were also produced according to a comparative process in a horizontal mixer.

Determination of the Turbidity:

By use of the Photometer Nephla LPG 239, company Dr. Lange, Germany, a filtered light beam with a wavelength of 860 nm which is incident on a round cell (cuvette type LZP 452) containing the test solution is scattered by undissolved particles, gel particles and fibres in a diffuse manner to all sides. The scattered light is measured at a 90° angle through the bottom of the cell without reflection against a dark background and displayed digitally as a measured value. The measured value corresponds to turbidity units of formazine (TU/F) according to DIN EN ISO 7027 and 7887. The test solution is a 2 weight percent aqueous solution of the cellulose ether. The turbidity is measured at 25° C.

Determination of the Undissolved Fibre Content (Manual Visual Method):

A 2 weight percent aqueous solution of cellulose ether is prepared. The fibre content in the solution is determined by visual comparison to standard solutions, using a light box with polarizing panes to make the fibre more visible. The standard solutions are based on a defined amount of ground cellulose fibres with lengths between 0.074 and 0.149 mm (see Table 1 below) suspended in deionized water. The method relies on visual evaluation and rating of the solutions at 25° C.

TABLE 1

| Fibre rating | Weight of pulp mg/l |
| --- | --- |
| 0 | 0 |
| 1 | 2.01 |
| 2 | 4.03 |
| 3 | 8.05 |
| 4 | 16.11 |
| 5 | 32.21 |
| 6 | 64.43 |

Comparative Example 1

Methyl Hydroxyethyl Cellulose 26 kg of ground cellulose are introduced into a pressure-resistant horizontal mixer having a usable reaction volume of 400 l, equipped with a ploughshare mixing unit with horizontal mixing shaft, an installed chopper and attached condenser. The mixer is evacuated and flushed with nitrogen for inertization purpose.

Thereafter, 12.7 kg of sodium hydroxide in the form of a 50% by weight aqueous sodium hydroxide solution are sprayed onto the cellulose by means of nozzles over 17 min with mixing. Thereafter, the alkalization reaction takes place over 30 min at about 35° C.

In the next step, a mixture of 31.7 kg of dimethyl ether and 33.9 kg of chloromethane is introduced into the reactor. Thereafter, 3.6 kg of ethylene oxide are metered into the reactor followed by 10.2 kg of chloromethane and 3.07 kg of sodium hydroxide as 50% by weight aqueous sodium hydroxide solution during heating up to about 75° C. in about 50 min. After keeping the temperature at 77° C. for 35 min the pressure is released and the volatile components are removed by evaporation. The crude product is subjected to washing with hot water, then dried and ground.

Example 2

Methyl Hydroxyethyl Cellulose 26 kg of ground cellulose are introduced into a vertical bulk material mixer (type AM400, from Amixon) having a filling volume of 400 l and a conical mixing region. The mixer is evacuated and flushed with nitrogen for inertization purpose. The vertical mixer used is characterized in that it has a helical ribbon mounted on a central shaft so that three-dimensional loop flow is effected. The ground cellulose is moved upwards close to the wall and flows downwards in the vicinity of the central stirrer shaft. In the conical mixer region in the lower part of the vertical mixer, a cutting rotor is mounted, in the vicinity of which a sodium hydroxide solution is added by means of a fan nozzle. The helical ribbon is operated at a speed of 30 rpm and the cutting rotor at max. 1500 rpm. After the inertization step 12.7 kg of sodium hydroxide in the form of a 50 wt.-% aqueous sodium hydroxide solution is fed in via the fan nozzle over 17 min with mixing of the cellulose. The alkalization reaction then takes place over 30 min at about 40 to 45° C.

After transfer of the alkali metal cellulose into the pressure-resistant horizontal mixer mentioned in comparative example 1, the horizontal mixer is evacuated and flushed with nitrogen for inertization purpose. The further procedure is carried out as described in comparative example 1, starting with introduction of 31.7 kg of dimethyl ether and 33.9 kg of chloromethane.

Comparative Example 3

Methyl Hydroxypropyl Cellulose 26 kg of ground cellulose are introduced into the pressure-resistant horizontal mixer according to comparative example 1. The mixer is evacuated and flushed with nitrogen for inertization purpose.

Thereafter, 22.1 kg of sodium hydroxide in the form of a 50 wt.-% aqueous sodium hydroxide solution are sprayed onto the cellulose by means of nozzles over 30 min with mixing. Thereafter, the alkalization reaction takes place over 30 minutes at about 38° C.

In the next step, a mixture of 39.1 kg of dimethyl ether and 21.0 kg of chloromethane is introduced into the reactor. Thereafter, 12.3 kg of propylene oxide are metered into the reactor followed by 20.2 kg of chloromethane and 7.4 kg of sodium hydroxide as 50% by weight aqueous sodium hydroxide solution during heating up to about 82° C. in about 125 min. After keeping the temperature at 85° C. for 55 min the pressure is released and the volatile components are removed by evaporation. The crude product is subjected to washing with hot water, then dried and ground.

Example 4

Methyl Hydroxypropyl Cellulose 26 kg of ground cellulose are introduced into a vertical bulk material mixer according to example 2. The mixer is evacuated and flushed with nitrogen for inertization purpose. The helical ribbon is operated at a speed of 40 rpm and the cutting rotor at max. 1500 rpm. After the inertization step 22.1 kg of sodium hydroxide in the form of a 50 wt.-% aqueous sodium hydroxide solution are fed in via the fan nozzle over 30 min with mixing of the cellulose. The alkalization reaction then takes place over 30 min at about 50 to 55° C.

After transfer of the alkali metal cellulose to the pressure-resistant horizontal mixer mentioned in comparative example 1, the mixer is evacuated and flushed with nitrogen for inertization purpose. The further procedure is carried as described in comparative example 3, starting with the introduction of 39.1 kg of dimethyl ether and 21.0 kg of chloromethane.

|  | DS (M) | MS (HE/HP) | Turbidity of solution TU/F | Fiber rating |
|---|---|---|---|---|
| Comparative example 1 | 24.7% | 6.4% | 12.1 | not measured |
| Example 2 | 24.2% | 6.6% | 6.8 | not measured |
| Comparative example 3 | 27.7% | 10.3% | 7.9 | 5 |
| Example 4 | 27.3% | 10.5% | 2.4 | 3 |

The products obtained by means of alkalization in the separate vertical mixer differ clearly in the solution behaviour in comparison with the conventional process. In an aqueous solution, the products have a clearly increased solubility to give a clear solution and have a reduced proportion of insoluble fibres, which is due to improved alkalization.

| List of reference numerals | |
|---|---|
| 1 | mixing apparatus |
| 2 | vertical mixer |
| 3 | mixing reactor |
| 20 | cylindrical part |
| 21 | tapering part |
| 22 | inlet valve |
| 23 | mixing device |
| 24 | motor |
| 25 | vertical rotational axis |
| 26 | motor |
| 27 | mixing device |
| 28 | inlet opening |
| 29 | inlet opening |
| 30 | rotational axis |
| 31 | mixing means |
| 32 | motor |
| 33 | inlet opening |
| 102 | conically shaped vertical mixer |
| 102a | upper section |
| 102b | lower section |
| 120 | inlet valve |
| 121 | mixing device |
| 122 | axis |
| 123 | vertical axis |
| 124 | housing |
| 125 | arrow |
| 126 | arrow |
| 127 | motor |
| 128 | inlet opening |
| 129 | inlet opening |
| 202 | vertical mixer |
| 202a | upper section |
| 202b | lower section |
| 220 | inlet valve or opening |
| 221 | mixing device |
| 222 | motor |
| 224 | mixing device |
| 225 | vertical axis |
| 226 | motor |
| 227 | inlet opening |
| 228 | inlet opening |

The invention claimed is:

1. A process for the production of alkali cellulose comprising the reaction of a cellulose with an alkali metal hydroxide, characterized in that the alkali metal hydroxide is mixed with a batch of ground cellulose in a mixing apparatus, the mixing apparatus having an upper region with a first cross-section and a lower region with a second cross-section, the second cross-section being smaller than the first cross-section and comprising at least one non-horizontally oriented continuous or divided single-shaft mixing device in the form of a screw or single or double helix.

2. The process of claim 1 wherein the mixing apparatus comprises a vertically oriented conically shaped section, the vertically oriented conically shaped section being provided in the lower region of the mixing apparatus.

3. The process of claim 2 wherein the mixing apparatus comprises a mixing device rotatable by an essentially centrally and vertically oriented axis and the distribution of the alkali metal hydroxide in the mixing apparatus is promoted by a mixing or cutting rotor located in the vicinity of the feed point of the alkali metal hydroxide.

4. The process of claim 1, wherein the alkali metal hydroxide is added to the cellulose at a feed point in the lower region of the mixing apparatus.

5. The process according to claim 1, wherein the alkali metal hydroxide is added to the cellulose at a feed point in a region of the mixing apparatus having a tapering cross section.

6. The process of claim 1, wherein the mixing apparatus comprises a mixing device rotatable by an essentially centrally and vertically oriented axis.

7. The process of claim 1, wherein the mixing apparatus with respect to its longitudinal extension comprises a diagonally oriented mixing device being capable of rotating around a vertical axis.

8. Process according to claim 1, wherein the distribution of the alkali metal hydroxide in the mixing apparatus is promoted by a mixing or cutting rotor located in the vicinity of the feed point of the alkali metal hydroxide.

9. The process according to claim 1, wherein the mixing apparatus is coolable by a cooling jacket or cooling coils, and/or wherein the mixing apparatus is operated under an inert atmosphere, and/or wherein the mixing apparatus is designed to be resistant to pressure surges for downstream pressure reactions.

10. The process according to claim 1, wherein the alkali metal hydroxide is fed into a mixing apparatus as an aqueous solution of the alkali metal hydroxide.

11. The process according to claim 1, wherein the alkali metal hydroxide is mixed with cellulose in the mixing apparatus by a loop flow.

12. The process according to claim 1 further comprising reacting the alkali cellulose with one or more derivatizing agents for the production of cellulose derivatives.

13. The process according to claim 12 wherein the derivatizing agent is an alkylating agent, a, hydroxyalkylating agent or both.

14. The process according to claim 12, wherein the produced cellulose ether is selected from the group consisting of alkylcelluloses, hydroxyalkylalkylcelluloses or hydroxyalkylcelluloses.

15. The process according to claim 1, wherein the mixing apparatus is either pressure-resistant or not pressure-resistant, and if the mixing apparatus is pressure-resistant, the alkali cellulose is reacted with said one or more alkylating agents, said one or more hydroxyalkylating agents or both in the mixing apparatus or is transferred to another pressure-resistant reaction vessel and reacted there with the alkylating agents or the hydroxyalkylating agents or both, or if the mixing apparatus is not pressure resistant, the alkali cellulose is transferred to a pressure-resistant reaction vessel and reacted there with said one or more alkylating agents, said one or more hydroxyalkylating agents or both.

* * * * *